United States Patent [19]
Luck

[11] 3,966,993
[45] June 29, 1976

[54] PROCESS FOR MAKING SOLID SAUCE BAR
[75] Inventor: John V. Luck, Lakewood, Ohio
[73] Assignee: SCM Corporation, New York, N.Y.
[22] Filed: May 20, 1970
[21] Appl. No.: 39,183

[52] U.S. Cl. .............................. 426/589; 426/652
[51] Int. Cl.² ..................... A23L 1/40; A23L 1/195
[58] Field of Search ............... 99/144, 123; 426/589

[56] References Cited
UNITED STATES PATENTS
2,168,360  8/1939  Musher ............................ 99/144 X
3,300,319  1/1967  Marotta et al. ....................... 99/144
3,652,299  3/1972  Penton ................................ 99/144

*Primary Examiner*—Jeanette M. Hunter
*Attorney, Agent, or Firm*—Richard H. Thomas

[57] ABSTRACT

A process for making a solid sauce bar by mixing fat flour and condiments, tempering the mixture, and subsequently casting and cooling the bar until it is stable at room temperature.

3 Claims, No Drawings

PROCESS FOR MAKING SOLID SAUCE BAR

This invention relates to convenience sauce and gravy mixes, and more particularly to those that are a solid bar form at normal room temperature and are convertible on mixing with aqueous edible liquid into edible sauces, and to a process for making same.

Advantages of this sauce mix over pulverulent sauce mixes include convenience in handling, compactness, ease of storage, and economy in packaging. Advantages of this bar over previously proposed sauce bars include improved palatability and resistance to off-flavor development, resistance to rancidity, and improved dimensional stability. The advantages of this sauce bar can be obtained at less cost, as neither polysaccharides nor a binder with a high percentage of water is required.

The bar of this invention has excellent storage stability, desirable appearance and gloss, good regidity and resistance to deformation at normal handling temperatures, and is easily converted into a sauce or gravy. The sauces and gravies have desirable smooth consistency and can be made with rich, well-developed flavors. My process protects against loss of desirable appearance of the bar in ordinary storage.

My sauce bar comprises an intimate mixture of 40–60 parts of edible, tempered, emulsified triglyceride fat having acyl radicals of preponderantly $C_{16}$–$C_{18}$ chain length, having melting points of about 100° to 125°F., and having sufficient solid fat at ambient room temperature to permit molding and handling in bar form and 15 to 40 parts of farinaceous flour or starch, and 5 to 45 parts of condiment solids having particle size not substantially greater than about 30 microns.

My process comprises intimately mixing together the fat, farinaceous flour or starch, and condiment solids, tempering the resulting mixture in an agitated tempering zone until fat crystals are generated, forming the tempered mixture into a solid bar under conditions precluding complete remelting of the fat crystals, and cooling the resulting bar until it is dimensionally stable at room temperature.

The total fat content of the gravy bar must be about 40 to 60 per cent of the total bar weight so that the bar can be easily converted to a palatable sauce which is readily pourable and of smooth consistency. Less than about 40 weight per cent of the fat is insufficient to give unitary, blocklike stability for handling, and greater than about 60 weight per cent produces a greasy bar yielding sauce or gravy that is not palatably desirable. Preferably, I use about 40 to 50 weight per cent of fat to insure thorough wetting of the flour and produce a sauce that has a good consistency with desirable palatability and appearance.

I have found that certain fats are unsuitable for use in my invention, because they tend to deteriorate on standing and convert to sauces that leave a soapy sensation in the mouth. Lauric fats, i.e. glycerides containing a significant content of $C_{12}$ and lower acyl groups, are of this type. Thus, I use the edible triglyceride fats that have acyl radicals of preponderantly $C_{16}$–$C_{18}$. These can be made or obtained to exhibit excellent shelf stability against soapy flavor development and produce sauces that are smooth and agreeable to the taste. My hydrogenated domestic oils and fractions and mixtures thereof are suitable for this invention. They can be derived, for example, from soybean oil, cottonseed oil, peanut oil, lard, tallow, and palm oil.

The fat must have a Wiley melting point within the range of about 100° to 125°F. and a minimum Solids Fat Index of 30% solids. The Solids Fat Index is the best described in the Official and Tentative Methods of the American Oil Chemists Society Coded CD 10-57 (revised 1960, corrected 1961), for the development of the proper physical and palatability characteristics of the bar such as rigidity at room temperature and freedom from tallow-like or waxy sensation in the mouth. Softer and more plastic fats are not sufficiently resistant to deformation of shape at ordinary room temperatures and are likely to yield bars that become pasty and lose dimensional stability during shelf life or have a tendency to fat "bleed" on standing.

Suitably, the fat component in the saucer bar has a low Iodine Value, i.e. about 70 or less, and thus has adequate resistance to rancidity over prolonged storage periods. Additionally, the fat can contain minute amounts of sequestering agents such as citric acid, and anitoxidants such as butylated hydroxy toluene, propyl gallate, and nordihydroguaiaretic acid.

Small amounts, e.g. not more than about 15% basic weight of fat, and preferable about 0.1 to 5% on a similar basis, of edible emulsifiers advantageously are incorporated with the fat in the sauce bar to assist in the rapid hydration of the solids and conversion to a smooth, uniform sauce of good stability. These emulsifiers include monoglycerides-diglycerides, potassium oleate, lecithin, sorbitan esters of fatty acids. Of these I prefer lecithin and superglycerinated fats (40–45% monoglyceride, the balance predominantly diglyceride) because of their economy, bland taste, and easy blendability with the triglyceride fat.

The balance of the basic bar consists essentially of farinaceous flour and starch and condiment solids, that is, spices, salt, sugar, extending and flavoring agents, etc. Typical condiment solids include salt, sugar, monosodium glutamate, toasted onion, white pepper, powdered onion, curry powder, turmeric, ginger, cayenne, pulverized bouillon, powdered mustard, powdered garlic, powdered mushrooms, cheese flavor, ground celery seed, tomato crystals, lemon crystals, corn syrup solids, non-fat dry milk solids, dried eggs or egg fractions, meat powder, fish powder, edible cellulose or cellulosic materials such as particulate crystalline cellulose having molecular weight of about 30,000 to 50,000 and 10–50 micron particle sizes, proteinaceous material such as hydrolyzed soya protein, and mixtures of the foregoing. Of course, certain types and combinations of these condiment solids are useful in producing specialty sauces, such as mushrooms in mushroom gravy, but I do not mean to limit myself in this manner. The condiment solids must have particle size in their largest dimension not greater than about 30 microns and preferably from about 20 to 25 microns to obtain surface gloss on the bar and avoid a dull, unappetizing appearance. In addition, these small particles assist in achieving a smooth sauce that is nongrainy and thus has good palatability.

I use about 15 to 40 weight per cent, basis total basic bar, of edible farinaceous flour or starch, e.g. wheat, rice, or potato flour, vegetable or grain starch finely pulverized or modified, or mixtures thereof, to make a bar for thick sauce or gravy. Use of greater than about 40 weight per cent of the farinaceous flour produces a sauce which is hard to pour and becomes stiff and curdy. If I use less than about 15 weight per cent of flour, starch, etc., there is not a sufficient proportion of these solids present in the sauce to body the fat and obtain palatable thickening and supress a greasy oral quality of the resulting sauce. For best results, I prefer to use about 15 to 38 weight per cent of the edible farinaceous flour to form a non-oily product of agreeable consistency.

The sauce bar can contain suitable liquid flavoring and colorings, in addition to the above-described food solids, that are absorbed on the basic bar solids. These include caramel color, vegetable colorings, and various essential oils such as clove oil, thyme oil, tarragon oil, sage oil, wild marjoram oil, and basil oil. Furthermore, for added body and flavor, and to produce a sauce or gravy of home-made appearance, I can add bits or chunks of foodstuff such as dried mushrooms, minced onion, dried meat, and dehydrated vegetable foodstuff such as dehydrated carrots or potatoes.

The total moisture content of the inventive bar, including indigenous moisture of the ingredients such as condiment solids, flour, and food chunks, should not exceed about 5 per cent of the total bar weight, and should be preferably not more than about 2 to 3 per cent to maintain best storage stability and to resist off-flavor development (which otherwise could develop by degradation or putrefaction of proteins, etc., such as in meat or grain solids). The bar package can be permeable to atmospheric moisture, because the fat enrobing of the solids is effective in protecting them from deleterious contact with ordinary atmospheric moisture.

My sauce bars are manufactured for ready conversion in aqueous liquid to appetizing sauces and gravies. By aqueous liquid I mean to include water, milk, cream, vinegar, wine, lemon juice, and syrup solutions. Reconstitution of the bar in these liquids can be achieved most easily by warming the liquid to a temperature substantially above room temperature and by agitation of the sauce bar-liquid dispersion for a short time to develop full-bodied flavor of the sauce. Advantageously, I use about one quart of liquid for 4 ounces of sauce bar, but about 3 to 5 ounces of sauce bar per quart of liquid can be adequately used to prepare sauces of differing pourability.

In manufacturing, I can grind all of the basic bar condiment solids to the proper particle size, being careful to except the bits and chunks such as mushrooms, onion, etc., which are added later. These ground solids then can be mixed into a portion or all of the melted fat and blended to a uniform batch. However, I prefer to blend all of the condiment solids into a molten portion of the fat, and mill this fat portion in a roll refiner to comminute the solids present. The refining not only comminutes the condiment solids, but also contributes to a more uniform product by intimately blending and coating these solids with the emulsifier-containing fat. To this fraction I then stir in the farinaceous flour, food chunks, if desired, and remaining melted fat to produce a uniform mixture of the basic bar ingredients. Alternatively, I can grind a blended fat-condiment solid mixture in a hammer, rod, or ball type mill to achieve particle size reduction and mixing.

After a molten batch is prepared, I must temper it prior to further processing to form an initial thick mush of stable fat crystals. By so doing, I induce the formation of stable fat crystals in the polymorphic fat that contribute to a good gloss in the sauce bar and produce a smooth, nongrainy surface on the bar. Additionally, such a bar resists the development of fat bloom, e.g. change in fat crystal structure with concurrent greying of the bar surface, so that during storage it retains its attractive surface appearance.

I prefer to temper the batch by cooling in an agitated tempering zone until fat crystallization gives the mix thick, mushy consistency. The mix is then held at this point for several minutes to allow the development of stable fat crystals. Preferably, the tempering zone can be maintained at a temperature range of about 10° to 20°F. below the melting point of the fat constituency of the mix. After cooling, I then reheat the mix, being careful not to remelt all of the stable fat crystals in the mix to produce a bar resistant upon final cooling to change in fat crystal structure. Reheating decreases the thickness of the mush, so that it then can be poured easily into molds and cooled to a final bar product. However, I can extrude the mush without reheating to form a bar or rod. The product can also be flaked, and the flakes compressed into bars, scored for division, etc., but for compactness, ease of handling, and ease of packaging, I prefer casting it to a bar form.

The following examples show various ways in which my invention has been practiced, but should not be construed as limiting the invention. The moisture content of all bars prepared was less than 5%.

EXAMPLE 1

A brown gravy bar was prepared by melting at a temperature of 130°F., 10 parts of a hydrocottonseed fat having a melting point of 119°F., and a Solid Fat Index of 45% at 70°F. and containing 0.4 parts lecithin, and mixing this melted, emulsified fat with 13.10 parts pulverized bouillon, 8.08 parts dextrin, 3.46 parts artificial flavoring, 1.15 parts sugar, 1.15 parts caramel color, 0.62 parts monosodium glutamate, and 0.31 parts black pepper.

This fat-condiment solids mixture was blended in a Hobart mixer until a uniform dispersion of the dry ingredients in the molten fat was obtained. During the blending, the temperature of the blend was allowed to drop to 100°F. After blending, the mixture was passed through a 3-roll refiner set at about 25 microns in the final nip, to reduce the particle size of the condiment solids to below about 30 microns in their largest dimension and to further coat with fat. The product was collected and blended with 30.00 parts of the hydrocottonseed fat described above, 28.80 parts flour, and 3.33 parts minced onion, the blending being done in a Hobart mixer until uniform, the mixture being heated to a temperature of 130°F. during blending.

This final mixture was tempered by cooling to 105°F. with agitation until fat crystallization gave the entire mix a thick, mushy consistency. The mix was held at this point for several minutes to allow the development of stable fat crystals. The mixture was then slowly warmed up to a temperature of 114°F. at which point the mixture was readily pourable, yet contained sufficient fat crystals to seed the remaining molten fat. A portion of the mix was then poured into a 1¾ ounce bar mold and allowed to harden in a refrigerated cabinet held at 45°F. The resulting bar had good structural rigidity, excellent retention of bar shape, a glossy surface, and resisted deformation at elevated temperatures (100°F.). It was easily packaged by wrapping with sheet material and stacked on a shelf for storage, many bars being able to be stacked on top of one another without rigid separators.

After one month of storage, the bar was removed from the shelf where it had been stored at 100°F., and examined. It retained its bar shape and glossy surface, and there was no indication of fat "bloom" on the bar. The bar was put in a pan with a cup of cold water, and the water heated to boiling. In a short time, the bar melted, and the mixture was stirred and simmered for one minute. The resulting gravy was then examined and tasted. It had smooth consistency, rich flavor, no soapy or rancid flavor, was easily pourable, and had excellent palatability with no waxy or tallow mouth sensation.

A portion of the gravy was poured into a jar, and the jar allowed to cool at room temperature for 1 hour. The jar was then capped and refrigerated at 40°F. for 24 hours. After this refrigeration, the contents of the jar were emptied into a pan and reheated to 160°F. with occasional stirring. The resulting gravy was then tested and poured, and it was found to be comparable in all respects to the gravy prepared initially by direct dispersion of the bar in water.

EXAMPLE 2.

An onion gravy bar was prepared by melting 10.0 parts of the hydrocottonseed fat described in Example 1 at 130°F., and combining this melted fat with 7.56 parts pulverized bouillon, 5.05 parts granulated sugar, 2.76 parts salt, 2.52 parts powdered onion, 0.76 parts monosodium glutamate, 0.51 parts powdered garlic, 0.51 parts caramel color, and 0.01 parts oleo-resin black pepper.

This fat-condiment solids mixture was then blended and milled in the same manner as the brown gravy fat-condiment solids mixture of Example 1. The product was collected and further blended with 30.0 parts of the hydrocottonseed fat, 37.8 parts of flour, and 2.52 parts minced onion, in a Hobart mixer with heating to a temperature of 130°F. during blending.

This mixture was tempered, reheated, cast, and cooled in the manner of Example 1. The resulting onion gravy bar was solid at room temperature, had a glossy, nongrainy surface, and resisted slumping and deformation of bar shape at 100°F. It was easily packaged and withstood handling and stacking without breakage.

The bar was stored, prepared as a gravy, and the bar and gravy examined in the same manner as in Example 1. The bar retained its gloss, flavor, and rigidity, and there was not visual evidence of fat bloom on the bar surface. The gravy was rich, smooth, and non-waxy, and it contained bits of minced onion that gave added zest. The gravy was easily poured and could be refrigerated for repreparation, the gravy thus resulting being similar in taste and physical characteristics to the original gravy.

EXAMPLE 3

A Hollandaise Sauce Bar was prepared by melting 10.00 parts of the hydrocottonseed fat described in Example 1 at 130°F., and mixing the melted fat with 31.14 parts egg yolk solids, 5.78 parts nonfat milk solids, 5.36 parts salt, 1.71 parts citric acid, 0.55 parts artificial lemon flavor, and 0.01 parts oleoresin black pepper.

This fat-condiment solids mixture was then milled in the same manner as the brown gravy fat-condiment solids mixture of Example 1. The product was collected and further blended with 30 parts of the hydrocottonseed fat and 15.45 parts of arrowroot starch in a Hobart mixer while heating to a temperature of 130°F. during blending.

This mixture was tempered, reheated, cast, and cooled in the same manner as in Example 1. The resulting mushroom gravy bar was rigid at normal room temperature (72°F.), had a glossy appearance, and resisted deformation of bar form at elevated temperature (100°F.). The bar was easily packaged and several such bars could be stacked one on another for storage at 100°F. After two months, the bar was examined and found to have maintained good gloss and bar shape and had resisted fat bloom.

The bar easily dispersed in water to yield a sauce prepared in a manner similar to the brown gravy prepared in Example 1. The gravy was rich and smooth, felt non-waxy to the mouth, had excellent flavor, and could be refrigerated and reheated without any noticeable loss in physical characteristics or palatability.

EXAMPLE 4

A chicken gravy bar was prepared by melting 10 parts of a hydrogenated beef tallow which had a melting point of 121°F. and a Solid Fat Index of 42% at 70°F. and mixing this molten fat with 7.92 parts hydrolyzed vegetable protein, 7.44 parts special chicken seasoning (monosodium glutamate, chicken, salt, sugar, flavoring, malto-dextrin, chicken fat, hydrolyzed vegetable fat, spice, dextrose, and hydrogenated vegetable fat), 3.35 parts nonfat milk solids, 3.35 parts sugar, 2.55 parts salt, 2.60 parts powdered onion, 1.49 parts dehydrated chicken broth, and 0.05 parts caramel color.

This fat-condiment solids combination was then blended and milled in the same manner as the brown gravy fat-condiment solids combination of Example 1. The product was collected and further blended with 30.0 parts of the hydrocottonseed fat, 29.76 parts of flour, and 1.49 parts of dried chicken pieces in a Hobart mixer while heating to a temperature of 130°F.

The mixture was tempered, reheated, cast, and cooled in the same manner as the brown gravy mixture of Example 1. The resulting chicken gravy bar exhibited good gloss and rigidity, and resisted slumping of bar shape at temperatures as high as 100°F. The bar was wrapped and maintained at this temperature for one month, after which time it was found to have retained its original shape and good gloss with no visual evidence of fat bloom.

The bar was easily dispersed in boiling water to yield a rich gravy prepared in the same manner as the brown gravy of Example 1. This chicken gravy had good flavor and no trace of off-flavor development, was easily pourable and produced no soapy taste or waxy sensation in the mouth. The gravy could be cooled, stored by refrigeration for several days, and reheated to produce gravy having no noticeable loss in taste appeal or physical characteristics.

EXAMPLE 5

A mushroom sauce mix was prepared by the process described in Example 1. The recipe for the mushroom sauce was 6 parts melted hydrocottonseed fat, 3 parts pulverized bouillon, 0.3 part of monosodium glutamate, 1 part salt, 1.4 parts sugar, 0.5 part powdered onion, 0.1 part white pepper, 0.5 part dry caramel color, 2 parts powdered mushroom and 0.5 part ground celery seeds.

What is claimed is:

1. A process for making a sauce bar convertible on mixing with aqueous liquid into an edible sauce which comprises:
   a. intimately mixing together 40 to 60 parts of melted, edible emulsified triglyceride fat having acyl radicals of preponderantly $C_{16}$–$C_{18}$ chain length and having a Wiley melting point of about 100° to 125°F. and a minimum of 30% Solid Fat Index at 70°F., and 15 to 40 parts of farinaceous flour, and 5 to 45 parts of condiment solids having particle size not substantially greater than about 30 microns;
   b. tempering the resulting mixture in an agitated tempering zone until fat crystals are generated, forming a solid bar of the tempered mixture under conditions precluding complete remelting of said fat crystals; and
   c. cooling the resulting bar until it is dimensionally stable at room temperature.

2. The process of claim 1 wherein said tempering is carried on at a temperature of about 100° to 110°F.

3. The process of claim 2 wherein said tempered mixture is cast into a mold and cooled until it is dimensionally stable at room temperature.

* * * * *

UNITED STATES PATENT AND TRADEMARK OFFICE
CERTIFICATE OF CORRECTION

PATENT NO. : 3,966,993
DATED : June 29, 1976
INVENTOR(S) : John V. Luck

It is certified that error appears in the above-identified patent and that said Letters Patent are hereby corrected as shown below:

Column 5, line 19, change "tested" to --tasted--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*